(12) United States Patent
Robles

(10) Patent No.: US 9,763,539 B2
(45) Date of Patent: Sep. 19, 2017

(54) ADJUSTABLE FIRE PIT GRILL

(71) Applicant: Steven Robles, Coalinga, CA (US)

(72) Inventor: Steven Robles, Coalinga, CA (US)

(\*) Notice: Subject to any disclaimer, the term of this patent is extended or adjusted under 35 U.S.C. 154(b) by 351 days.

(21) Appl. No.: 14/511,216

(22) Filed: Oct. 10, 2014

(65) Prior Publication Data

US 2015/0196163 A1   Jul. 16, 2015

Related U.S. Application Data

(60) Provisional application No. 61/926,502, filed on Jan. 13, 2014.

(51) Int. Cl.
*A47J 37/07* (2006.01)
*A47J 33/00* (2006.01)

(52) U.S. Cl.
CPC ........ *A47J 33/00* (2013.01); *A47J 2037/0795* (2013.01)

(58) Field of Classification Search
CPC .......................... A47J 33/00; A47J 2037/0795
See application file for complete search history.

(56) References Cited

U.S. PATENT DOCUMENTS

| 5,094,223 | A | 3/1992 | Gonzalez |
| 6,711,993 | B2 | 3/2004 | Robertson |
| 6,776,084 | B2 * | 8/2004 | Wild ................. A47J 37/0704 126/25 R |
| 7,063,006 | B1 | 6/2006 | Spehle et al. |
| 2003/0075166 | A1 | 4/2003 | Glass |
| 2012/0318255 | A1 | 12/2012 | Brown |

\* cited by examiner

*Primary Examiner* — Alfred Basichas
(74) *Attorney, Agent, or Firm* — Global Intellectual Property Agency, LLC; Daniel Boudwin

(57) ABSTRACT

An adjustable fire pit grill device that includes an elongated central post having a first end secured within the ground in a fire pit, and a second end that extends out of the fire pit such that the central post is in a vertical orientation. The central post includes one or more channels that extend along the length of the central post. A cooking grate is secured within each of the elongated channels, and the grates are shaped as triangles or sections of a circle such that the grates form a circle, rectangle, square, or other shape when arranged around the central post. Each cooking grate can be independently raised and lowered by means of a removable hand crank that turns a spool that holds a length of cable. In this way, users can simultaneously cook various foods at different temperatures by adjusting the height of each grate.

15 Claims, 7 Drawing Sheets

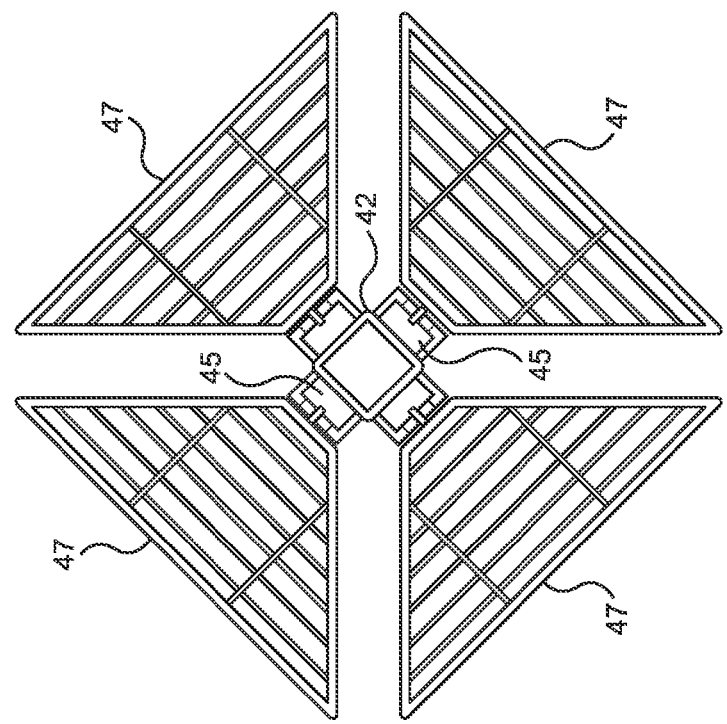
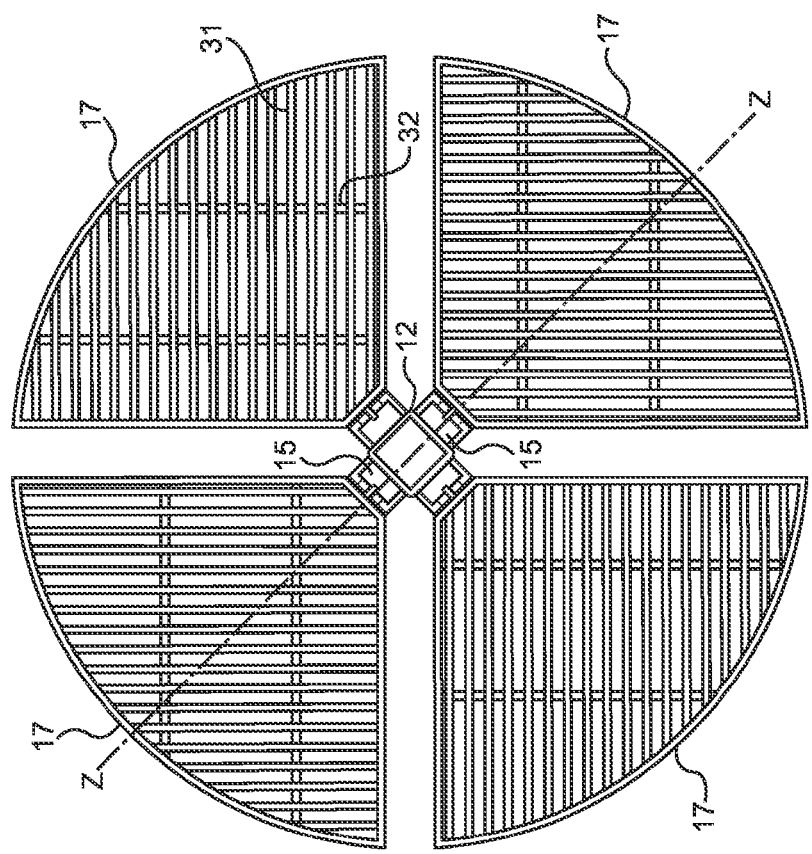
FIG. 3B
FIG. 3A

ADJUSTABLE FIRE PIT GRILL

CROSS REFERENCE TO RELATED APPLICATION

This application claims the benefit of U.S. Provisional Application No. 61/926,502 filed on Jan. 13, 2014, entitled "BBQ Fire Pit." The above identified patent application is herein incorporated by reference in its entirety to provide continuity of disclosure.

BACKGROUND OF THE INVENTION

Field of the Invention

The present invention relates to fire pit grills. More specifically, the present invention relates to a grill adapted to be disposed within a fire pit having a plurality of adjustable cooking grates. The cooking grates can be independently raised or lowered so as to place some grates closer to the flames within the fire pit than others. In this way, a user can cook various types of food simultaneously using a single grill device by adjusting the cooking grates to different heights.

Many people enjoy grilling food because of the ease of preparation and unique taste imparted on food when grilled. Grilling is particularly popular during periods of warm weather so that people can spend time outside and enjoy the outdoors while cooking their food. Further, grilling allows a user to easily monitor the food as it cooks, and food can be prepared quickly due to the high temperatures achieved by the grill.

However, conventional grills provide a limited surface area on which food can be cooked. Further, the entire surface area of the grill is generally heated to a single temperature. Many people often grill various food items in order to provide a selection for themselves or their guests. Because different food items need to be cooked at different temperatures, the user must generally prepare one food at a time, and adjust the temperature or the cooking grates in order to cook another food item. Further, the limited surface area prevents the user from cooking a large amount of food at a single time. Thus, the user must prepare food in a slow manner, and prepare different food items one by one. This prevents the person from being able to serve all the food at a single time, and requires the user to operate the grill for a longer period of time.

Many people use fire pits to contain a fire within an enclosed area. Fire pits allow users to quickly and easily start a well-controlled fire that will not spread out of the pre-defined area. People may dispose a cooking grate over the fire pit in order to allow the flames to cook the food placed on the cooking grate. However, such grates are not readily adjusted, and provide only a single surface on which food can be cooked. Thus, similar to a grill, the food on the cooking grate is subject to a single temperature that is not readily adjusted.

The present invention provides an adjustable fire pit grill device comprising an elongated central post disposed in an upright, vertical orientation. The first end of the elongated central post is secured in the ground within the fire pit and the second end extends out of the fire pit. The central post comprises a plurality of elongated channels thereon that extend between the first end and the second end. A cooking grate is disposed within each of the elongated channels and each cooking grate is adapted to slide along the length of the elongated channel in which it is disposed. In this way, a user can position each cooking grate at a different height along the central post. The cooking grates are preferably shaped as squares, rectangles, or sections of a circle, and are arranged around the central post so as to form a square, a rectangle, or a circle.

Description of the Prior Art

Devices have been disclosed in the prior art that relate to fire pit grill devices. These include devices that have been patented and published in patent application publications. These devices generally relate to fire pits having cooking grates or grill plates secured thereon. The following is a list of devices deemed most relevant to the present disclosure, which are herein described for the purposes of highlighting and differentiating the unique aspects of the present invention, and further highlighting the drawbacks existing in the prior art.

One such device, U.S. Patent Application Publication Number 2012/0318255 to Brown discloses a portable outdoor fireplace that is convertible into an open grill, a rotisserie assembly, and a smoker assembly. The device comprises a carriage assembly having a pair of wheels thereon. The device further includes a base pan for holding a solid fuel source having a removable screen assembly thereon. The device also includes a grill bracket that is capable of holding a cooking grate thereon, and that can be removably attached to the screen assembly such that the device can be used as a grill. The grill bracket can be positioned at various heights above the heat source as desired by the user. Thus, the device disclosed by Brown is not adapted for use with a fire pit and does not include a plurality of adjustable cooking grates disposed about a central post.

U.S. Pat. No. 6,711,993 to Robertson discloses a barbeque grilling device having three or more legs joined at an attachment point and having grill surfaces removably secured thereto. A heat source is disposed below the grill surfaces and may be removably secured to the legs. The heat source can include a pan in which hot coals or burning wood is positioned, or the heat source can be a propane burner. The location of the heat source can be adjusted so as to adjust the distance between the heat source and the grill surface. The device may also include a warming rack, a potholder, and a utensil arm. Further, the device is collapsible and can be disposed within a carrying case for ease of storage and transportation. Thus, Robertson fails to disclose a grill device for use with fire pits that includes a plurality of cooking grates disposed about a central elongated post.

U.S. Patent Application Publication Number 2003/0075166 to Glass discloses a free standing fire pit having a base support that is fully enclosed by a mesh screen. The screen includes an opening thereon to provide access to the interior of the fire pit. A cooking grill can be removably mounted within the fire pit near the opening of the screen. Thus, Glass discloses a free standing fire pit and does not disclose a grill device for use with a conventional fire pit.

U.S. Pat. No. 5,094,223 to Gonzalez discloses a portable fire pit having a fire bowl disposed on a base and a cylindrical wood receiving chamber disposed above the fire bowl. Gas rings encircle the chamber and a propane gas tank is releasably connected to the gas rings. In operation, wood can be stacked inside of the chamber and gas rings, and the gas rings are adapted to project flames towards the wood. A cooking grill can be disposed on top of the chamber. While Gonzalez discloses a portable fire pit with a cooking grill thereon, Gonzalez fails to disclose a grilling device that includes a plurality of cooking grates that can be disposed over a conventional fire pit.

U.S. Pat. No. 7,063,006 to Spehle et al. discloses a fire pit grill device having a housing that includes a motor that is adapted to rotate a drive shaft. A grill is suspended from the drive shaft by a plurality of tethers. The grill is adapted to rotate when the motor is turned on. The device is supported by a plurality of legs, wherein the legs are pivotally coupled to a panel through which the drive shaft is positioned. The device disclosed by Spehle includes a revolving grill plate suspended by tethers. Therefore, Spehle fails to disclose a grilling device for use with a fire pit that includes a plurality of adjustable cooking grates that can be adjusted to various heights.

These prior art devices have several known drawbacks. The devices known in the prior art relate to various fire pit apparatuses intended to contain a fire or fuel source. Such devices include grill plates thereon to allow a user to cook food. However, such devices are not adapted for use with conventional fire pits. Instead, the devices provide their own fuel source for cooking food or for providing heat. Further, such devices do not provide a user with a plurality of cooking grates that can be adjusted to different heights. This prevents the user from simultaneously cooking different types of food because some food items must be cooked at high temperatures, whereas others must be cooked at lower temperatures.

In light of the devices disclosed in the prior art, it is submitted that the present invention substantially diverges in design elements from the prior art and consequently it is clear that there is a need in the art for an improvement to existing grill devices for use with fire pits. In this regard the instant invention substantially fulfills these needs.

SUMMARY OF THE INVENTION

In view of the foregoing disadvantages inherent in the known types of fire pit grill devices now present in the prior art, the present invention provides a new fire pit grill device wherein the same can be utilized for providing convenience for the user when grilling various types of food in a fire pit.

It is therefore an object of the present invention to provide a new and improved adjustable fire pit grill device that has all of the advantages of the prior art and none of the disadvantages.

It is another object of the present invention to provide an adjustable fire pit grill device that can be disposed within a conventional fire pit.

Another object of the present invention is to provide an adjustable fire pit grill device that includes a plurality of cooking grates that is individually adjustable.

Another object of the present invention is to provide an adjustable fire pit grill device having a variety of interchangeable cooking grates, such as a griddle, a deep fry pan, and a cooking grate.

An additional object of the present invention is to provide an adjustable fire pit grill device having an elongated central post that can rotate about the longitudinal axis thereof.

Yet another object of the present invention is to provide an adjustable fire pit grill device that allows a user to simultaneously cook several types of food at different temperatures.

Another object of the present invention is to provide an adjustable fire pit grill device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3A shows an overhead view of an embodiment of the fire pit grill of the present invention having a circular construction.

FIG. 3B shows an overhead view of an embodiment of the fire pit grill of the present invention having a square construction.

DETAILED DESCRIPTION OF THE INVENTION

Figure 1:
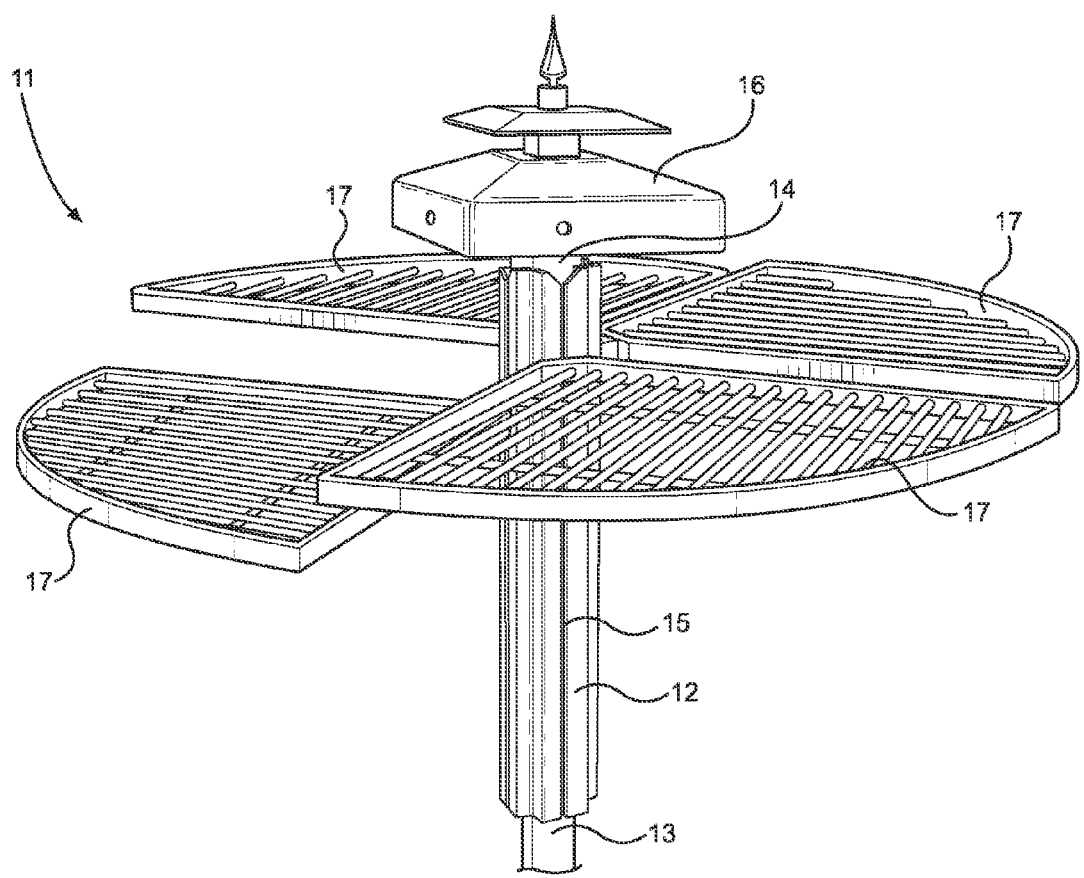
FIG. 1 shows a perspective view of an embodiment of the fire pit grill of the present invention.

Reference is made herein to the attached drawings. Like reference numerals are used throughout the drawings to depict like or similar elements of the adjustable fire pit grill of the present invention. For the purposes of presenting a brief and clear description of the present invention, the preferred embodiment will be discussed as used for cooking several types of food simultaneously using a fire pit. The figures are intended for representative purposes only and should not be considered to be limiting in any respect.

Referring now to FIG. 1, there is shown a perspective view of an embodiment of the fire pit grill of the present invention. The grill device 11 comprises an elongated central post 12 having a first end 13 and a second end 14. The first end 13 is adapted to be secured within the ground such that the central post 12 can be maintained in an upright, vertical orientation. Alternatively, the first end 13 may include a base plate thereon that is adapted to facilitate positioning the central post 12 in an upright orientation, wherein the base plate is substantially perpendicular to the central post 12. The base plate can be bolted or cemented to the ground in order to secure the central post 12 in an upright orientation. The second end 14 of the central post 12 comprises a decorative housing 16 thereon. Preferably, the central post 12 comprises a square cross section, such that the central post 12 has four sides. Further, the central post 12 preferably comprises a hollow interior. The central post 12 can be composed of steel, or another durable, heat resistant material.

The central post 12 comprises one or more elongated channels 15 thereon defined by channel walls. The channels 15 extend between the first end 13 of the central post 12 and the second end 14 thereof. Preferably, one channel 15 is disposed on each side of the central post 12. Thus, in embodiments wherein the central post 12 is square shaped and has four sides, there are four elongated channels 15, wherein one channel 15 is disposed on each side of the central post 12. A cooking grate 17 is slidably secured within each elongated channel 15. The cooking grates 17 are oriented such that they are substantially perpendicular to the central post 12.

Figure 2:
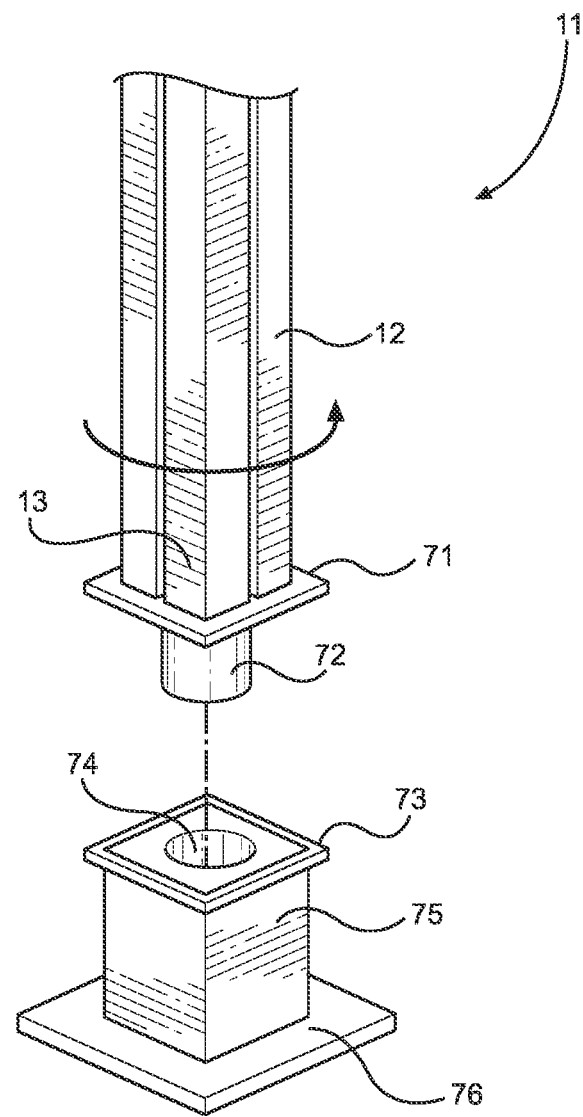
FIG. 2 shows a view of an embodiment of the central post wherein the central post can rotate.

Referring now to FIG. 2, there is shown a view of an embodiment of the central post adapted to allow the central post to rotate. In some embodiments of the present invention, the central post 12 may be adapted to rotate about a vertical axis. The vertical axis corresponds to the longitudinal axis of the central post 12. This allows the user to rotate the grill device 11 in order to stay upwind of any smoke produced by the food as it is cooking. Further, the ability to rotate the grill device 11 provides users with greater access to food placed on the grill device 11.

A base member comprises a base plate 76 having a mounting post 75 thereon. The base plate 76 is substantially flat and is adapted to rest against the ground. The base plate 76 may be cemented in position on the ground, or may be bolted to the ground. The mounting post 75 includes a hollow bore 74 extending from the upper end thereof towards the bottom end thereof. The hollow bore 74 is adapted to receive a cylindrical member 72 disposed on the bottom end 13 of the central post 12. The cylindrical member 72 can rotate within the hollow bore 74 so as to allow the central post 12 to rotate along the longitudinal axis thereof. The lower end 13 of the central post 12 may include a sleeve 71 disposed about the perimeter thereof, wherein the sleeve 71 helps to support the central post 12 in an upright position, and helps to prevent lateral movement of the central post 12. The sleeve 71 on the central post 12 engages with a sleeve 73 on the upper end of the mounting post 75.

Referring now to FIG. 3A, there is shown an overhead view of an embodiment of the adjustable fire pit grill of the present invention having a circular construction. One or more cooking grates 17 are slidably secured within the elongated channels 15 on the central post 12. The cooking grates 17 are disposed in a horizontal orientation, perpendicular to the central post 12 so that food can be positioned thereon. In the illustrated embodiment, the cooking grates 17 are shaped as sections of a circle. In this way, one or more cooking grates 17 can be arranged so that the cooking grates 17 form a circular shape around the central post 12. In the illustrated embodiment of the present invention, the grill device 11 includes four cooking grates 17 each shaped as a quadrant of a circle. Thus, when the four cooking grates 17 are arranged about the central post 12, the grill device 11 has a circular shape. However, in alternate embodiments of the present invention fewer or additional cooking grates 17 may be included. For example, three cooking grates 17 may be used, wherein each cooking grate 17 is shaped as a third of a circle, such that the cooking grates 17 when disposed about the central post 12 still form a circular shape. Thus, the grill device 11 of the present invention can be constructed so as to have a variety of numbers of cooking grates 17.

Referring now to FIG. 3B, there is shown an overhead view of an embodiment of the fire pit grill of the present invention having a square construction. In the illustrated embodiment, the cooking grates 47 are triangularly shaped. In this way, one or more cooking grates 47 can be arranged so that the cooking grates 47 form a square shape around the central post 42. In the illustrated embodiment of the present invention, the grill device 41 includes four cooking grates 47 each shaped as a triangle. However, in alternate embodiments of the present invention fewer or additional cooking grates may be included. Preferably, the grill device of the present invention is shaped similarly to the fire pit in which it will be positioned. Thus, an embodiment of the present invention having a square configuration of cooking grates is adapted for use with a square fire pit.

Figure 4A:
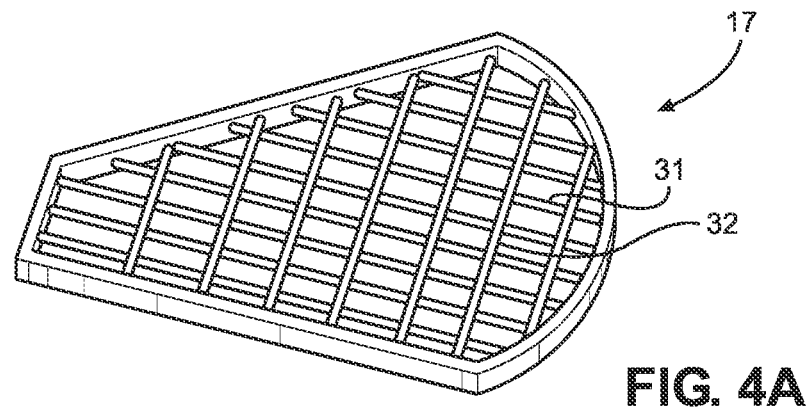
FIG. 4A shows an embodiment of a cooking grate of the present invention having crossbars.

Referring now to FIG. 4A, there is shown a view of an embodiment of a cooking grate of the present invention. The illustrated embodiment of the cooking grate 17 includes a plurality of cross bars 31 that are disposed parallel to one another and are spaced sufficiently close that food items can be placed thereon without falling through. The spacing between the cross bars 31 also allows for air to flow through the cooking grates 17. Further, one or more support bars 32 are disposed transversely on an underside of the crossbars 31 so as to provide support and stability to the surface of the cooking grate 17. In some embodiments of the present invention, the cooking grates 17 include an upwardly extending flange about the perimeter thereof to help prevent food from falling off of the edges of the cooking grate 17.

Figure 4B:
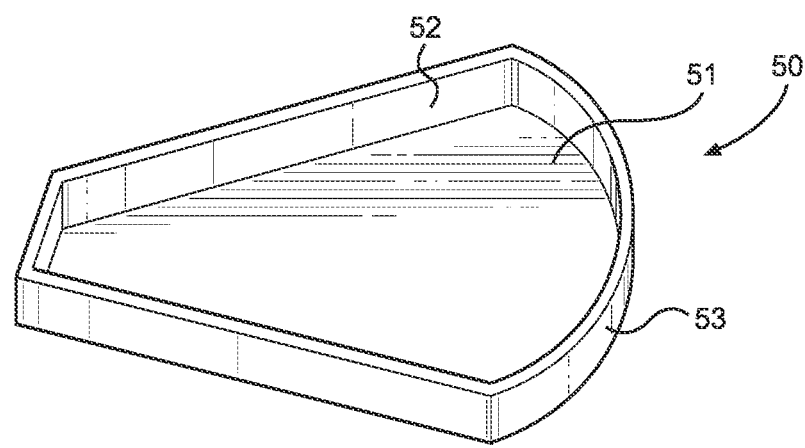
FIG. 4B shows an embodiment of a cooking grate of the present invention having a pan.

Referring now to FIG. 4B, there is shown a view of a deep fry pan of the present invention. One or more of the cooking grates may comprise a deep fry pan 50. The deep fry pan 50 comprises the same shape as the cooking grate of FIG. 3A, however, the deep fry pan includes a flat, solid base 51 and upstanding sidewalls 52. In this way, oil or other liquid can be held within the deep fry pan 50 and heated therein so that a user may deep fry food on the deep fry pan 50. The deep fry pan 50 can be used instead of a cooking grate having a plurality of cross bars in order to provide additional means for preparing food.

Figure 4C:
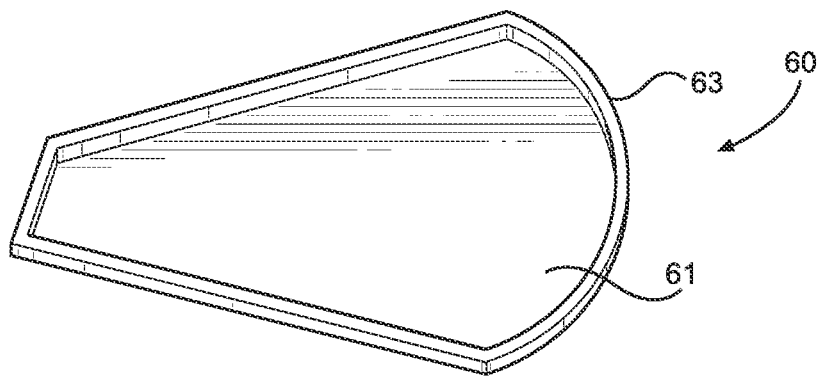
FIG. 4C shows an embodiment of a cooking grate of the present invention having a flat surface.

Referring now to FIG. 4C, there is shown a view of a cooking grate of the present invention having a flat surface. The cooking grate 60 of the illustrated embodiment is shaped similarly to the cooking grate of FIG. 4A and instead includes a flat surface 61 rather than crossbars. In this way, a user may prepare food by simply placing the food on the flat surface 61 of the cooking grate 60. The cooking grate 60 includes no openings or holes therethrough, preventing any food placed thereon from falling into the fire pit therebelow.

Figure 5:
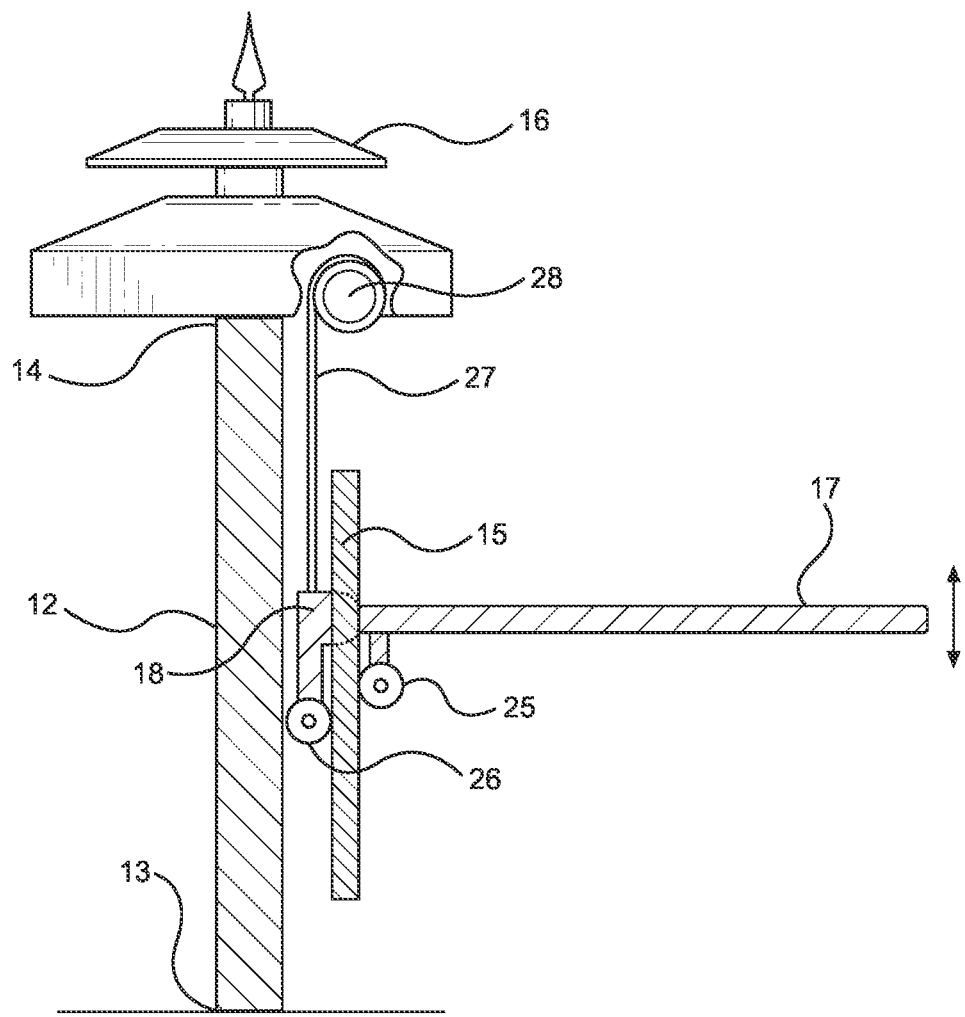
FIG. 5 shows a side cut-out view of the central post of the present invention and a cooking grate disposed thereon.

Referring now to FIG. 5, there is shown a side cut-out view of the central post of the fire pit grill of the present invention as taken along line z in FIG. 3A. Each side of the central post 12 comprises an elongated channel 15 defined by channel walls. The channel walls are disposed vertically and extend parallel to the surfaces of the central post 12. The cooking grates 17 are secured to the grill device 11 by means of a sliding mechanism 18 disposed between said central post 12 and the channel walls having one or more bearings thereon. A cable 27 having a first end and a second end is attached to the sliding mechanism 18 at the first end and the second end of the cable 27 is wrapped around a spool 28 located at the second end 14 of the grill device 11 within the decorative housing 16 thereon. Thus, a cable 27 extends vertically downward from the spool 28 and is attached to the sliding mechanism 18 on the cooking grate 17. As the cable 27 is wound onto the spool 28, the cable 27 draws the cooking grate 17 upward towards the second end 14 of the grill device 11. Similarly, as cable 27 is unwound from the spool 28, the cooking grate 17 is lowered towards the first end 13 of the grill device 11.

The sliding mechanism 18 further comprises a first bearing 25 disposed on the underside of the cooking grate 17 and that is in contact with the exterior surface of the channel walls. As the cooking grate 17 is raised or lowered, the first bearing 25 rolls along the exterior surface of the channel walls so as to allow the cooking grate 17 to be easily raised or lowered without significant frictional resistance. Similarly, a second bearing 26 is positioned between the central post 12 and channel wall. The second bearing 26 is in contact with the central post 12, channel wall 15, or both. The second bearing 26 may be disposed above or below the surface of the cooking grate, depending upon the embodiment. As the cooking grate 17 is raised or lowered, the second bearing 26 moves along the exterior of the central post 12 and the interior surface of the channel wall.

Figure 6:
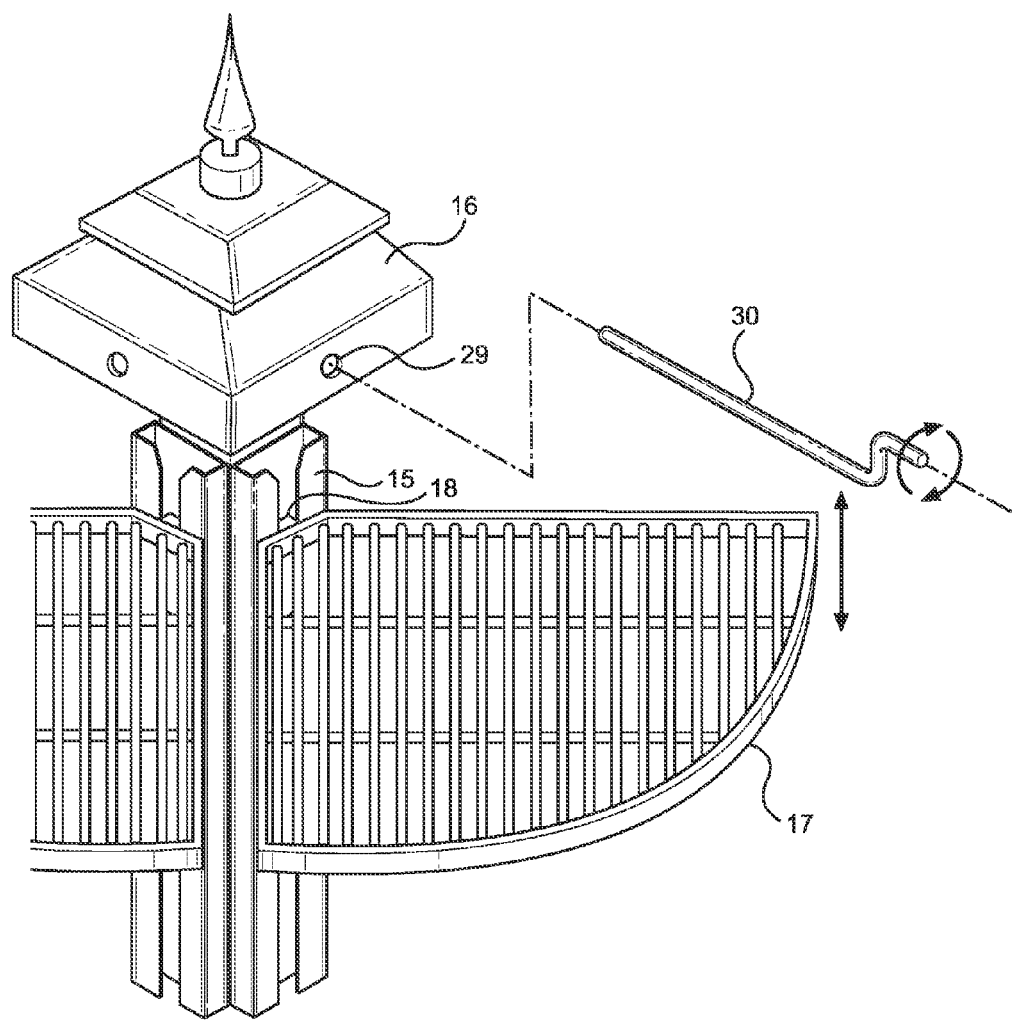
FIG. 6 shows a perspective view of an embodiment of the fire pit grill and a cooking grate disposed thereon

Referring now to FIG. 6, there is shown a perspective view of an embodiment of the fire pit grill and a cooking grate disposed thereon. The decorative housing 16 disposed on the second end of the elongated central post comprises a plurality of openings 29 thereon. One opening 29 is disposed on each side of the decorative housing 16, and each opening 29 corresponds to a single spool disposed within the decorative housing 16. Each opening 29 is adapted to receive a hand crank 30. The hand crank 30 preferably comprises an elongated rod. In the illustrated embodiment, the hand crank 30 includes a first section, a second section perpendicular to the first section, and a third section perpendicular to the second section and parallel to the first section. When inserted into an opening 29 on the decorative housing 16, the hand crank 30 engages a spool disposed within the decorative housing 16 so that turning the hand crank 30 serves to wind or unwind cable from the spool, thus raising or lowering the cooking grate 17 to which the cable is attached. Once the cooking grate 17 is disposed at the desired height, the hand crank 30 can be removed from the opening 29, and the cooking grate 17 will remain locked at the selected elevation.

Figure 7:
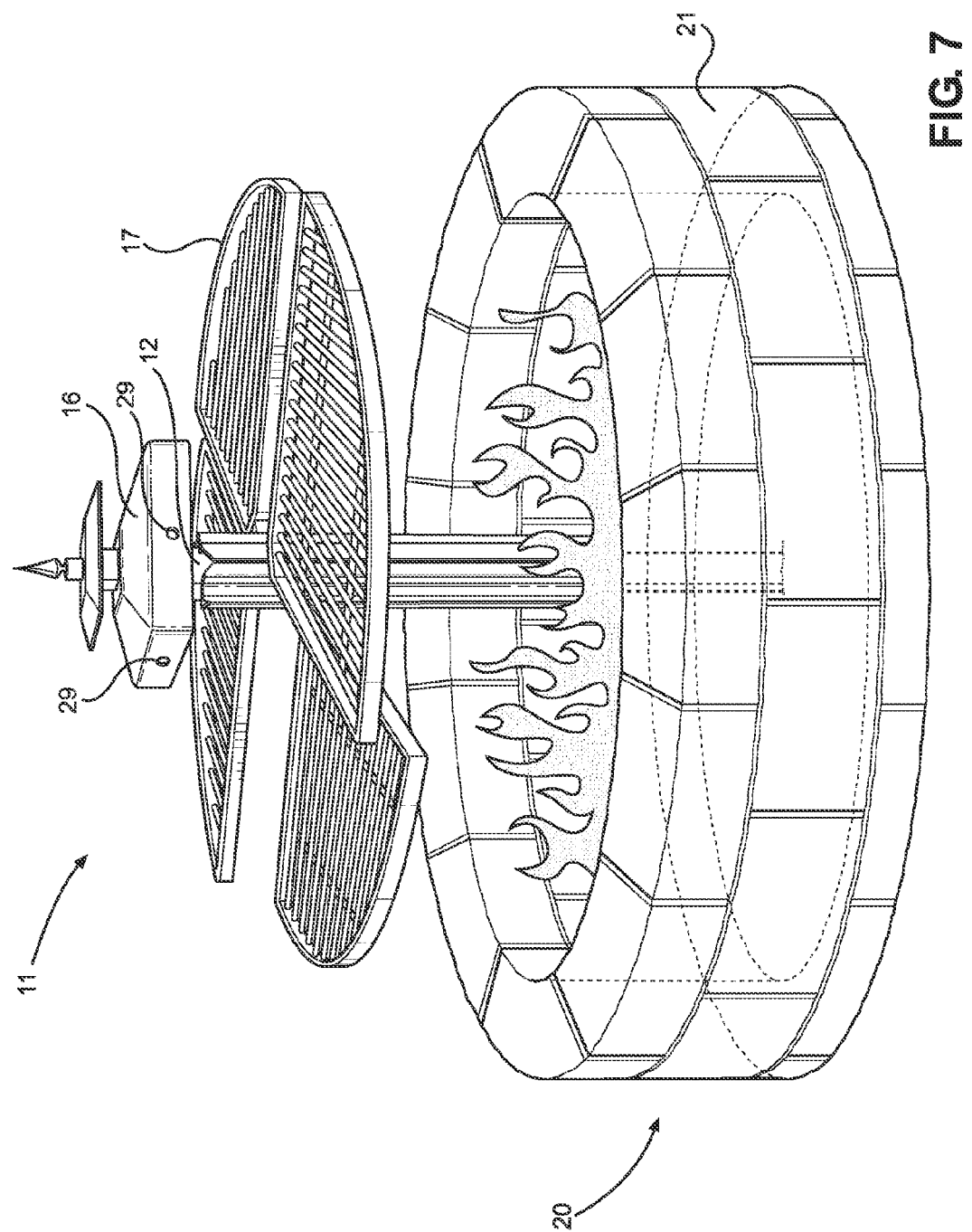
FIG. 7 shows a perspective view of the present invention as disposed within a fire pit.

Referring now to FIG. 7, there is shown a perspective view of the present invention as disposed within a fire pit. The fire pit 20 comprises a retaining wall 21 that defines an interior volume in which a fire can be created and maintained. The grill device 11 of the present invention can be positioned within the fire pit 20 such that the first end of the central post 12 is secured within the ground in a central area of the fire pit 20. The central post 12 is positioned in an upright, vertical orientation, and the second end thereof extends above the height of the retaining walls 21 of the fire pit 20. The second end includes a decorative housing thereon that encloses the spools and cables to which each cooking grate 17 is attached.

In operation, a user can adjust each cooking grate 17 to a desired height. This allows the user to dispose each cooking grate 17 at a different height as required to prepare different types of foods. In this way, the user can arrange some cooking grates 17 close to the fire so as to cook food thereon at a high temperature, and can dispose other cooking grates 17 farther from the fire so as to cook food thereon at a relatively lower temperature. Thus, the user can simultaneously cook various types of food such as steak, chicken, scallops, and vegetables, among others.

In order to adjust the height of the cooking grates 17, the user can insert a hand crank into the opening on the decorative housing associated with a particular cooking grate 17. By turning the hand crank, a cable attached to the cooking grate is wound or unwound from a spool located within the decorative housing. Thus, the user can easily raise and lower each cooking grate as desired.

The user may use any combination of cooking grates. The user may use one or more cooking grates having a plurality of bars thereon. The user can also use cooking grates having a pan shape so that the cooking grate can hold oil or other liquid therein. Further, the user can use a cooking grate having a flat surface for use as a griddle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill device for use with fire pits, comprising:
    an elongated central post comprising a first end and a second end, wherein said first end is adapted to be secured to a horizontal support surface such that said central post is disposed in an upright, vertical orientation;
    one or more elongated channels disposed on said central post, wherein said one or more elongated channels extend between said first end and said second end of said central post, said second end of said central post comprises a decorative housing thereon;
    a plurality of cooking grates, wherein each of said plurality of cooking grates is adjustably secured to one of said one or more elongated channels, such that said plurality of cooking grates are adapted to slide along the length of said one or more elongated channels;
    a sliding mechanism disposed on each of said one or more cooking grates adapted to allow said one or more cooking grates to slide along the length of said elongated channels;
    a cable having a first end and a second end;
    wherein said first end of said cable is secured to said sliding mechanism;
    wherein said second end of said cable is wound on a spool disposed within said decorative housing, such that said one or more cooking grates are adapted to be raised or lowered by winding or unwinding said cable on said spool.

2. The grill device of claim 1, wherein said central post comprises a square cross-section.

3. The grill device of claim 1, wherein said cable is wound or unwound on said spool by means of a hand crank that is removably operably connected to said spool.

4. The grill device of claim 1, wherein said sliding mechanism further comprises a first bearing thereon that is adapted to facilitate raising and lowering said cooking grate within said channel;
    wherein said first bearing is disposed on a lower surface of said one or more cooking grates and said first bearing directly contacts an exterior surface of said one or more elongated channels.

5. The grill device of claim 4, further comprising a second bearing disposed on said sliding mechanism, wherein said second bearing is positioned between said central post and an interior surface of said one or more elongated channels.

6. The grill device of claim 1, wherein said one or more cooking grates are shaped as a quadrant of a circle.

7. The grill device of claim 1, wherein said one or more cooking grates are shaped as a triangle.

8. The grill device of claim 1, wherein said one or more cooking grates comprise a plurality of cross bars spaced at fixed intervals and adapted to support food thereon.

9. The grill device of claim 8, wherein said cooking grates further comprise one or more support bars disposed transversely underneath said cross bars.

10. The grill device of claim 1, wherein at least one of said one or more cooking grates comprises a deep fry pan comprising a flat base and upstanding sidewalls, such that said deep fry pan is adapted to hold a liquid therein.

11. The grill device of claim 1, wherein at least one of said one or more cooking grates comprises a griddle having a flat surface.

12. The grill device of claim 1, wherein said central post comprises a base plate disposed on said first end adapted to facilitate positioning of said central post on a horizontal support surface.

13. The grill device of claim 1, wherein said central post is mounted within a mounting base adapted to allow said central post to rotate about a longitudinal axis thereof.

14. The grill device of claim 1, wherein said plurality of cooking grates are arranged so as to form a circular shape about said central post.

15. The grill device of claim 1, wherein said plurality of cooking grates are arranged so as to form a square shape about said central post.

* * * * *